Oct. 27, 1964   J. J. WADLINGER ETAL   3,154,225
PLASTIC CONTAINERS FOR LIQUIDS
Filed Oct. 2, 1963
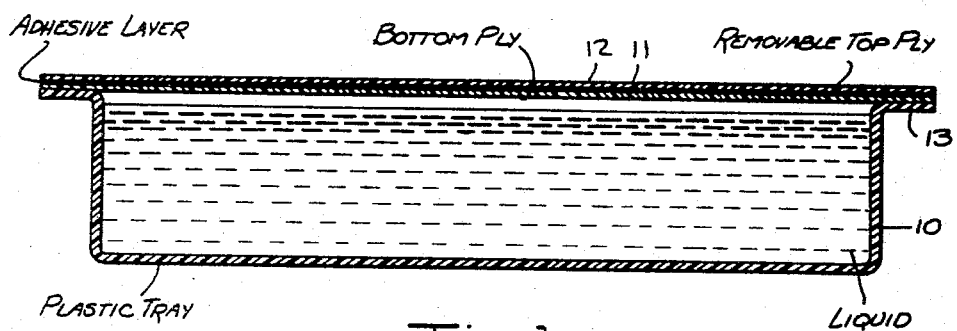
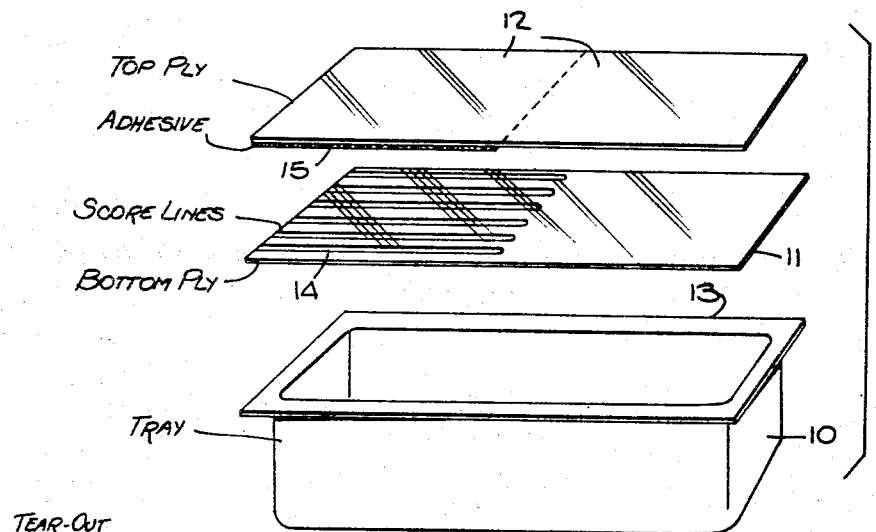
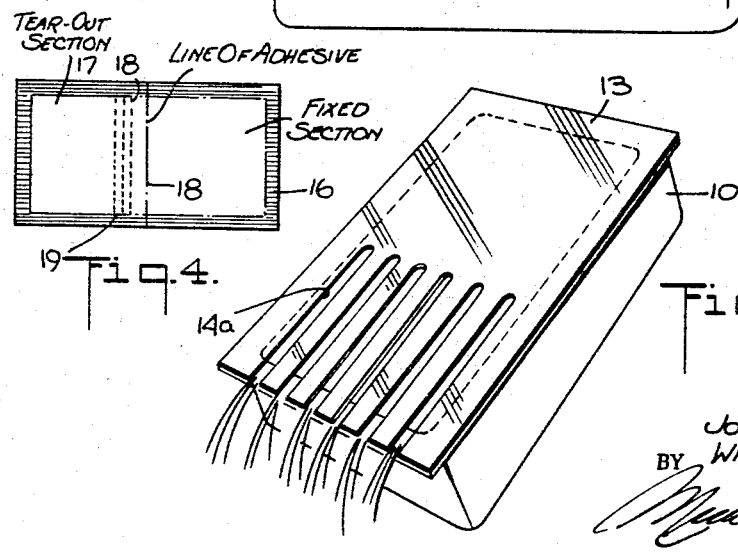
INVENTORS
JOSEPH J. WADLINGER
WILLIAM SIMMEN
BY
ATTORNEY

United States Patent Office 3,154,225
Patented Oct. 27, 1964

3,154,225
PLASTIC CONTAINERS FOR LIQUIDS
Joseph J. Wadlinger, Ramsey, and William Simmen, Passaic, N.J., assignors to High Vacuum Manufacturing Corporation, New York, N.Y., a corporation of New Jersey
Filed Oct. 2, 1963, Ser. No. 313,306
4 Claims. (Cl. 222—485)

This invention relates generally to plastic containers for liquids, and more particularly to small, individual-portion containers which can be uncovered to permit pouring without causing objectionable spillage of the liquid as the cover is being removed.

It is the current practice in institutional or large-scale feeding operations, as on commercial airlines or in industrial restaurants, to supply cream, salad dressing and other liquids in small individual-portion containers, rather than to pass around bowls or jars containing the liquid. For this purpose, restaurant-size plastic containers are used, which containers are ordinarily constituted by a small molded tray having a flange to which a removable cover is adhesively bonded. To open the container, it is necessary to strip off the cover and, in the act of doing so, there is a tendency for the liquid to spill from the tray. The force necessary to pull off the cover tends to jar the tray, and it is difficult to avoid such spillage.

Accordingly, it is the main object of this invention to provide a small liquid container or package having a laminated cover whose bottom ply is edge-sealed to a tray and includes a removable section or area which is attached by an adhesive layer to a top ply, whereby when the top ply is pulled off, the removable section is carried therewith to open the tray.

It is also an object of this invention to provide a small liquid container or package having a laminated cover whose top ply is removable to expose small, splash-resistant slots in a bottom ply which remains secured to the tray, whereby objectionable spillage is obviated.

Also an object of the invention is to provide a liquid container having a laminated cover forming a leakproof package capable of withstanding rough handling.

Still another object of the invention is to provide a plastic container for liquids which may be mass-produced at very low cost.

Briefly stated, these objects are attained in a container comprising a tray having a peripheral flange and a laminated cover for said tray including a bottom ply bonded to said flange to seal liquid therein, the bottom ply having a removable area which is attached by an adhesive layer to the top ply such that when the top ply is peeled off, the removable area on the bottom ply remains attached thereto to form an opening in the tray.

For a better understanding of the invention, as well as other objects and further features thereof, reference is made to the following detailed description to be read in conjunction with the accompanying drawing, where:

FIG. 1 is a longitudinal section taken through a tray in accordance with the invention;

FIG. 2 is an exploded view in perspective showing the tray and laminated cover components of the container;

FIG. 3 is a perspective view showing the liquid being poured from the container, whose top cover ply has been removed; and FIG. 4 is a plan view showing a modified form of bottom ply.

Referring now to FIG. 1, the container in accordance with the invention comprises a tray 10 and a laminated cover therefor, constituted by a bottom ply 11 and a top ply 12. The tray is formed of a suitable plastic material which is non-reactive with the liquid to be held therein. Polyethylene, for example, is suitable for cream. In practice, the tray is preferably vacuum-formed, and while only a single tray is shown, in manufacture, a sheet of thermoplastic plastic material may be vacuum-formed to define simultaneously a large array of trays, which after being filled and covered in the manner to be described, may thereafter be sectioned into individual units.

Tray 10 is of generally rectangular configuration, and is provided with a peripheral planar flange 13. The bottom ply, which is a rectangular panel of the same dimensions as the flange, is marginally bonded thereto. In practice, this ply may be formed of a thin oriented styrene film about 1 mil in thickness. The bonding of the bottom ply to the flange is preferably carried out by heat and pressure, in accordance with well-known techniques.

A parallel series of slots 14 extending longitudinally about half the length of the bottom ply, is formed by means of score lines which virtually penetarte the bottom ply without, however, causing the slotted material to fall out. The upper ply 12 is attached to that half portion of lower ply 11 which includes the slots, by means of an adhesive layer 15. The upper ply may be made of a material such as cellophane or coated paper. The remaining half-portion of the upper ply is free of the bottom ply, and serves as a tab which may be grasped by the user, whereby when the top ply is stripped off, it at the same time carries with it the strips defined by the score lines to define active slots 14a, as shown in FIG. 3. Thus the exposed and slotted bottom ply now serves as a splashboard which permits one to pour out the liquid in the tray but which prevents spillage as the top ply is being stripped off.

Obviously, the strength of the adhesive bond between the top and bottom plies must exceed the residual strength of the scored strips forming the slots, so that when the top ply is removed, the scored strips remain attached to the top ply to open up the slots.

In the modified form of bottom ply shown in FIG. 4, the rectangular frame 16 represents the marginal zone bonded to the flange 13 of the tray. The bottom ply is provided with a tear-out section 17 defined by three parallel lines of perforation 18 and score lines 19 along the inner edge of the marginal zone. The adhesive layer is superposed over the tear-out section 17 and extends to the line 18. Thus when the top ply 12 is peeled off, the tear-out section 17 is carried therewith to form an opening in the tray.

While there have been shown preferred embodiments of the invention, it will be obvious that many changes may be made without departing from the essential spirit of the invention as defined in the annexed claims. For example, the same principles may be carried out in a container design including a cylindrical tray having an annular flange.

What is claimed is:

1. A container for liquids, comprising a tray having a rectangular configuration and a peripheral flange, and a laminated cover for said tray including a bottom ply bonded to said flange to seal liquid within said tray, a parallel series of slots being formed in a half portion of said bottom ply by score lines which penetrate the material of said ply, a top ply, and an adhesive layer joining said top ply only to said half-portion whereby the unadhered part of said top ply serves as a tab which when pulled removes said top ply from said bottom ply and carries with it the material of said bottom ply defined by said score lines, thereby opening said slots.

2. A container as set forth in claim 1, wherein said tray is vacuum-formed of polyethylene.

3. A container as set forth in claim 1, wherein said bottom ply is formed of oriented styrene film which is heat and pressure bonded to said flange.

4. A container as set forth in claim 1, wherein said top ply is formed of cellophane.

References Cited in the file of this patent

UNITED STATES PATENTS

| | | |
|---|---|---|
| 506,982 | Diamond | Oct. 17, 1893 |
| 909,202 | McWilliams | Jan. 12, 1909 |
| 2,516,471 | Letsch | July 25, 1950 |
| 2,776,787 | Nicol | Jan. 8, 1957 |
| 2,898,003 | Wilson et al. | Aug. 4, 1959 |
| 3,078,986 | Ushkow | Feb. 26, 1963 |
| 3,083,876 | Schneider et al. | Apr. 2, 1963 |
| 3,101,870 | Betner | Aug. 27, 1963 |
| 3,115,245 | Schechter | Dec. 24, 1963 |